United States Patent
Matsubara et al.

(10) Patent No.: US 8,038,572 B2
(45) Date of Patent: Oct. 18, 2011

(54) CONTROL APPARATUS FOR VEHICULAR DRIVE SYSTEM

(75) Inventors: Tooru Matsubara, Toyota (JP); Atsushi Tabata, Okazaki (JP); Masakazu Kaifuku, Okazaki (JP); Hidenori Kato, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 615 days.

(21) Appl. No.: 12/219,068

(22) Filed: Jul. 15, 2008

(65) Prior Publication Data
US 2009/0023547 A1 Jan. 22, 2009

(30) Foreign Application Priority Data
Jul. 18, 2007 (JP) .................. 2007-187385

(51) Int. Cl.
*B60K 1/02* (2006.01)
(52) U.S. Cl. .................. 477/3; 477/5; 477/6; 477/8
(58) Field of Classification Search .................. 477/3, 5, 477/6, 8
See application file for complete search history.

(56) References Cited

U.S. PATENT DOCUMENTS
| | | | |
|---|---|---|---|
| 2009/0042689 A1* | 2/2009 | Soliman et al. | 477/5 |
| 2009/0140521 A1* | 6/2009 | Bryan et al. | 290/31 |
| 2010/0228412 A1* | 9/2010 | Sah | 701/22 |

FOREIGN PATENT DOCUMENTS
| | | |
|---|---|---|
| JP | A-2005-264762 | 9/2005 |
| JP | A-2006-002913 | 1/2006 |

OTHER PUBLICATIONS

Office Action issued in Chinese Patent Application No. 2008101333266, dated Aug. 19, 2010 (with English translation).

* cited by examiner

*Primary Examiner* — Ha D. Ho
(74) *Attorney, Agent, or Firm* — Oliff & Berridge, PLC

(57) ABSTRACT

A control apparatus for a drive system of a vehicle includes (a) an electrically controlled differential portion having a differential state between rotating speeds of an input and an output shaft being controlled by controlling an operating state of a first electric motor, (b) a switching portion operable to switch a power transmitting path between the output shaft and a drive wheel of the vehicle, between a power transmitting state and a power cut-off state, and (c) a second electric motor connected to the power transmitting path. The control apparatus includes an excessive speed preventing portion configured to limit a rotating speed of the output shaft or an operating speed of the second electric motor when the power transmitting path is switched by the switching portion from the power transmitting state to the power cut-off state.

10 Claims, 9 Drawing Sheets

|  | C1 | C2 | B1 | B2 | B3 | SPEED RATIO | STEPPING RATIO |
|---|---|---|---|---|---|---|---|
| 1st | ○ |  |  |  | ○ | 3.357 | 1.54 |
| 2nd | ○ |  |  | ○ |  | 2.180 | 1.53 |
| 3rd | ○ |  | ○ |  |  | 1.424 | 1.42 |
| 4th | ○ | ○ |  |  |  | 1.000 | SPREAD 3.36 |
| R |  | ○ |  |  | ○ | 3.209 |  |
| N |  |  |  |  |  |  |  |

○ ENGAGED

US 8,038,572 B2

CONTROL APPARATUS FOR VEHICULAR DRIVE SYSTEM

CROSS REFERENCE TO RELATED APPLICATION

The present application claims priority from Japanese Patent Application No. 2007-187385, which was filed on Jul. 18, 2007, the disclosure of which is herein incorporated by reference in its entirety.

BACKGROUND OF THE INVENTION

1. Field of the Invention

The present invention relates in general to a control apparatus for a vehicular drive system, and more particularly to a control apparatus for a hybrid vehicle drive system including an electric motor, which control apparatus is configured to prevent excessive speeds of rotary elements such as the electric motor.

2. Discussion of Prior Art

There is known a hybrid type vehicle including (a) an electrically controlled differential portion including a differential mechanism, a first electric motor operatively connected to a rotary element of the differential mechanism, a drive power source, an input shaft connected to the drive power source, and an output shaft, a differential state between rotating speeds of the input and output shafts being controlled by controlling an operating state of the first electric motor, and (b) a second electric motor connected to a power transmitting path between the output shaft and drive wheels of the hybrid type vehicle. JP-2005-264762A discloses an example of a control apparatus for such a hybrid type vehicle. This publication discloses a technique for operating the first and second electric motors in the same direction upon starting of the drive power source in the form of an engine, to rapidly raise the operating speed of the engine to a level at which the engine can be started by ignition.

According to the control apparatus for the vehicular drive system as disclosed in the above-identified publication, the rotating speed of the output shaft of the electrically controlled differential portion may become excessively high exceeding a permissible maximum value in the absence of a load acting on the output shaft, when the power transmitting path is switched to a power cut-off state in the form of a neutral state during high-speed running of the vehicle. When the rotating speed of the output shaft of the electrically controlled differential portion becomes excessively high, not only an input rotary member of the power transmitting path connected to the output shaft, but also the second electric motor connected to the input rotary member are rotated at excessively high speeds, giving rise to a risk of deterioration of the durability of the input rotary member and second electric motor.

SUMMARY OF THE INVENTION

The present invention was made in view of the background art described above. It is therefore an object of this invention to provide a control apparatus for a drive system of a vehicle including an electrically controlled differential portion including a differential mechanism, an electric motor connected to the electric motor, a drive power source, an input shaft connected to the drive power source and an output shafts, a differential state between the input and output shafts being controlled by controlling an operating speed of the electric motor, which control apparatus prevents an excessive rotating speed of the output shaft when a power transmitting path of the vehicular drive system is switched to a neutral state during running of a vehicle.

The object indicated above can be achieved according to any one of the following modes of this invention, each of which is numbered like the appended claims and which depends from the other mode or modes, where appropriate, for easier understanding of technical features disclosed in the present application, and combinations of those features.

(1) A control apparatus for a drive system of a vehicle including (a) an electrically controlled differential portion having (i) a differential mechanism, (ii) a first electric motor operatively connected to a rotary element of the differential mechanism, (iii) a drive power source, an input shaft connected to the drive power source, and (iv) an output shaft, a differential state between rotating speeds of the input and output shafts being controlled by controlling an operating state of the first electric motor, and further including (b) a switching portion operable to switch a power transmitting path between the output shaft and a drive wheel of the vehicle, between a power transmitting state and a power cut-off state, the control apparatus comprising:

an excessive speed preventing portion configured to limit a rotating speed of the output shaft or an operating speed of the second electric motor when the power transmitting path is switched by the switching portion from the power transmitting state to the power cut-off state.

In the control apparatus of the above-described mode (1) of the present invention, the rotating speed of the output shaft of the electrically controlled differential portion or the operating speed of the electric motor is limited by the excessive speed preventing portion when the power transmitting path is switched by the switching portion from the power transmitting state to the power cut-off state. Accordingly, the control apparatus prevents an excessive rise of the output shaft, making it possible to prevent the deterioration of the durability of the rotary elements of the differential portion and the electric motor.

(2) The control apparatus according to the above-described mode (1), wherein the excessive speed preventing portion limits an output of the drive power source to limit the rotating speed of the output shaft or the operating speed of the second electric motor.

In the above-described mode (2) of the invention, the output of the drive power source is limited to reduce a torque of the output shaft of the differential portion. The reduction of the torque of the output shaft results in preventing an excessive rise of the rotating speed of the output shaft or the operating speed of the second electric motor.

(3) The control apparatus according to the above-described mode (2), wherein the excessive speed preventing portion limits the output of the drive power source such that an amount of limitation of the output is larger when the rotating speed of the output shaft or the operating speed of the second electric motor is relatively high than when the rotating speed or the operating speed is relatively low.

In the above-described mode (3) of this invention, the amount of limitation of the output of the drive power source is larger when the rotating speed of the output shaft or the operating speed of the second electric motor is relatively high than when the rotating speed or the operating speed is relatively low. For instance, the excessive speed preventing portion is configured not to limit the output of the engine when the operating speed of the second electric motor is lower than a predetermined upper limit, and to limit the output of the engine when the operating speed of the second electric motor is equal to or higher than the upper limit. In this case, the rotating speed of the output shaft or the operating speed of the second electric motor can be effectively limited.

(4) The control apparatus according to the above-described mode (2) or (3), wherein the drive power source is an internal combustion engine, and the excessive speed preventing portion limits an output of the internal combustion engine by implementing a fuel cut control of the internal combustion engine.

In the above-described mode (4) of the invention wherein the fuel cut control of the drive power source in the form of the internal combustion engine is implemented to limit the output of the drive power source, the torque of the output shaft is reduced to limit the speed of the output shaft or second electric motor.

(5) The control apparatus according to the above-described mode (2) or (3), wherein the drive power source is an internal combustion engine, and the excessive speed preventing portion limits an output of the internal combustion engine by limiting an angle of opening of a throttle valve of the internal combustion engine.

In the above-described mode (5) of the present invention wherein the throttle valve of the drive power source in the form of the internal combustion engine is limited to limit the output of the drive power source, the torque of the output shaft is reduced to limit the speed of the output shaft or second electric motor.

(6) The control apparatus according to the above-described mode (1), wherein the excessive speed preventing portion controls an operating speed of the first electric motor, to limit the rotating speed of the output shaft or the operating speed of the second electric motor.

In the above-described mode (6) of this invention, the operating speed of the first electric motor is suitably controlled to limit the rotating speed of the output shaft or the operating speed of the second electric motor owing to a differential function of the differential mechanism.

(7) The control apparatus according to any one of the above described modes (1)-(6), wherein the switching portion includes a manually operable shifting member having a plurality of shift positions, and switches the power transmitting path between the power transmitting state and the power cut-off state, according to an operation of the manually operable shifting member.

In the above-described mode (7) of the invention wherein the switching portion switches the power transmitting path between the power transmitting state and the power cut-off state, according to an operation of the manually operable shifting member having a plurality of shift positions, the power transmitting path is switched from the power transmitting state to the power cut-off state when the shifting member is operated to the shift position for selecting the power cut-off state.

(8) The control apparatus according to any one of the above-described modes (1)-(7), wherein the electrically controlled differential portion is operable as a continuously-variable transmission mechanism by controlling the operating state of the first electric motor.

In the above-described mode (8) of the present invention wherein the electrically controlled differential portion is operable as the continuously-variable transmission portion by controlling the operating state of the first electric motor, the vehicle drive torque can be smoothly changed. It is noted that the electrically controlled differential portion is operable not only as an electrically controlled continuously-variable transmission the speed ratio of which is continuously variable, but also as a step-variable transmission the speed ratio of which is variable in steps so that an overall speed ratio of the drive system can be changed to rapidly change the vehicle drive torque.

Preferably, the differential mechanism is a planetary gear set having three rotary elements consisting of a carrier connected to the input shaft of the electrically controlled differential portion, a sun gear connected to the first electric motor, and a ring gear connected to the output shaft of the electrically controlled differential portion. In this case, the differential mechanism consisting of a single planetary gear set can be simplified in construction, and the required axial dimension of the planetary gear set can be reduced.

Preferably, the above-described planetary gear set is a single-pinion type planetary gear set, so that the differential mechanism can be simplified in construction, and the required axial dimension can be reduced.

BRIEF DESCRIPTION OF THE DRAWINGS

The above and other objects, features, advantages, and technical and industrial significance of this invention will be better understood by reading the following detailed description of preferred embodiments of the present invention, when considered in connection with the accompanying drawings, in which.

DETAILED DESCRIPTION OF THE PREFERRED EMBODIMENT

First Embodiment

Figures 1, 2:
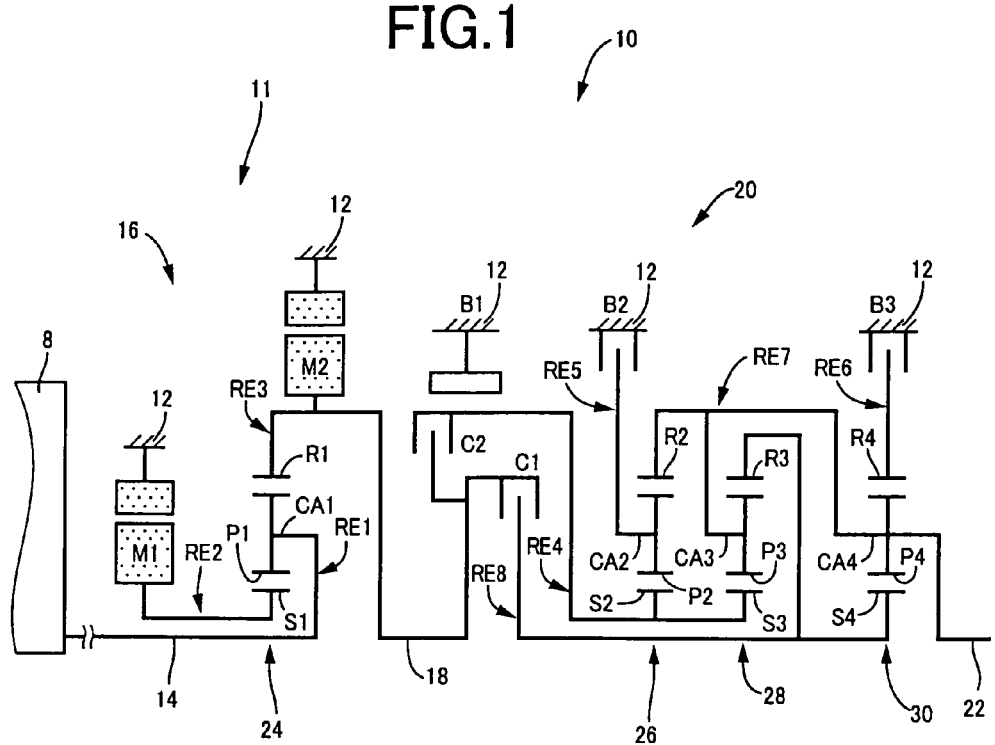
FIG. 1 is a schematic view showing an arrangement of a drive system of a hybrid vehicle, which is controlled by a control apparatus constructed according to one embodiment of this invention.
FIG. 2 is a table indicating shifting actions of an automatic transmission portion provided in the drive system of FIG. 1, in relation to different combinations of operating states of hydraulically operated frictional coupling devices to effect the respective shifting actions.
Figure 7:
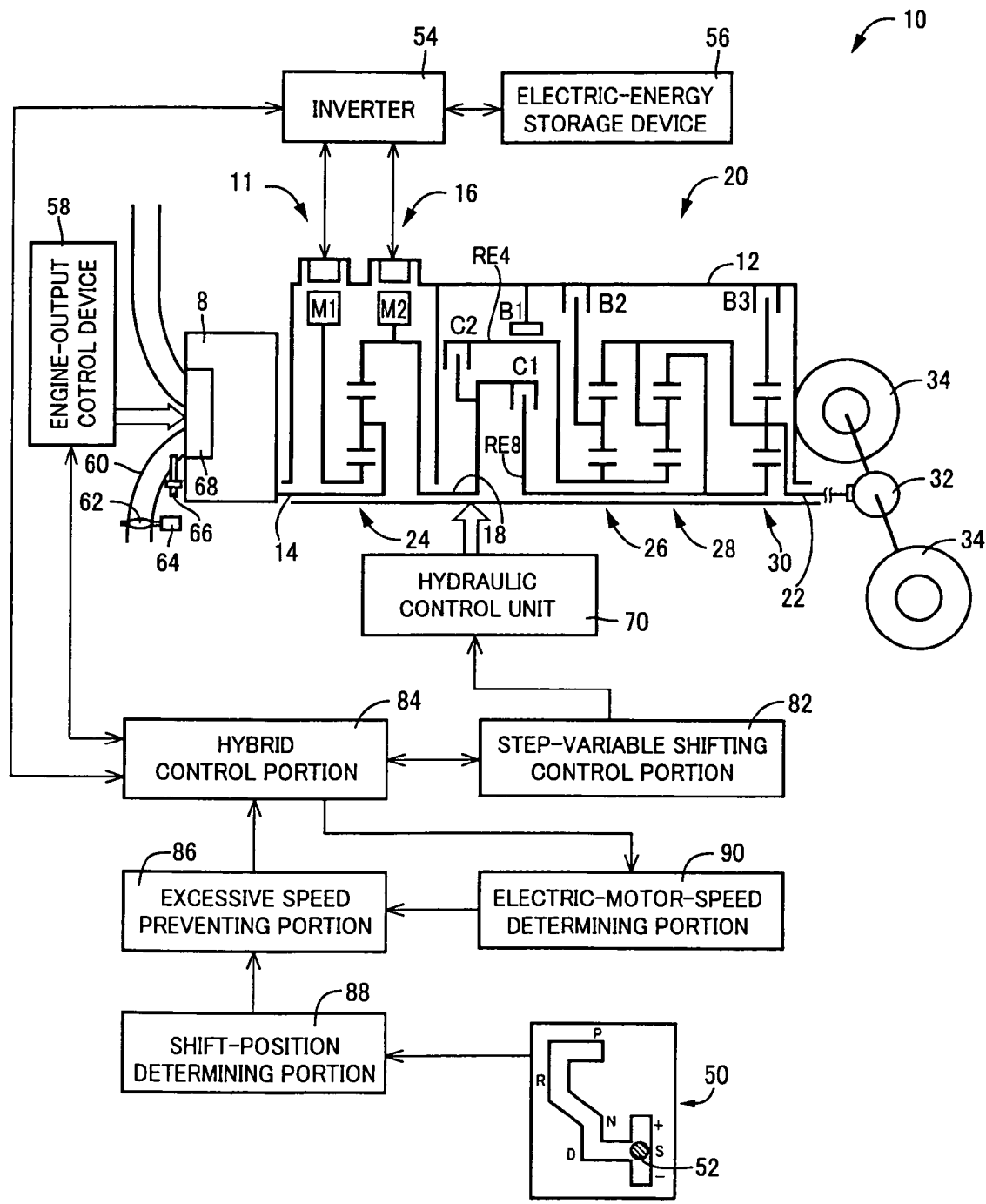
FIG. 7 is a functional block diagram illustrating major control functions of the electronic control device of FIG. 4.

Referring first to the schematic view of FIG. 1, there is shown a transmission mechanism 10 constituting a part of a drive system for a hybrid vehicle, which drive system is controlled by a control apparatus constructed according to a first embodiment of this invention. As shown in FIG. 1, the transmission mechanism 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a power transmitting portion in the form of a hydraulic automatic transmission portion 20 disposed between the differential portion 11 and drive wheels 34 (shown in FIG. 7) of the hybrid vehicle, and connected in series via a power transmitting member 18 (power transmitting shaft) to the differential portion 11 and the drive wheels 34; and an output rotary member in the form of an output shaft 22 connected to the automatic transmission portion 20. The input shaft 12, differential portion 11, automatic transmission portion 20 and output shaft 22 are coaxially disposed on a common axis in a transmission casing 12 (hereinafter referred to simply as "casing 12") functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 34, to transmit a vehicle drive force from the engine 8 to the pair of drive wheels 34 through a differential gear device 32 (final speed reduction gear) and a pair of drive axles, as shown in FIG. 7. The engine 8 may be a gasoline engine or diesel engine and functions as a vehicle drive power source directly connected to the input shaft 14 or indirectly via a pulsation absorbing damper. It will be understood that the engine 8 functions as a drive power source of the drive system.

In the present transmission mechanism 10 constructed as described above, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1. This is also true to a second embodiment of the invention which will be described following the description of the first embodiment.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is operatively connected to and rotated with the power transmitting member 18. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force. It will be understood that the differential portion 11 functions as an electrically controlled differential portion.

The power distributing mechanism 16 includes, as a major component, a first planetary gear set 24 of a single pinion type having a gear ratio ρ1 of about 0.418, for example. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1,: respectively, the above-indicated gear ratio ρ1 is represented by ZS1/ZR1. It will be understood that the power distributing mechanism 16 functions as a differential mechanism of the drive system.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The power distributing mechanism 16 constructed as described above is operated in a differential state in which three elements of the first planetary gear set 24 consisting of the first sun gear S1, first carrier CA1 and first ring gear R1 are rotatable relative to each other, so as to perform a differential function. In the differential state, the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Namely, the differential portion 11 (power distributing mechanism 16) functions as an electric differential device, which is operable in a continuously-variable shifting state (electrically established CVT state) in which the rotating speed of the power transmitting member 18 is continuously variable, irrespective of the rotating speed of the engine 8, namely, placed in the differential state in which a speed ratio γ0 (rotating speed $N_{IN}$ of the input shaft 14/rotating speed $N_{18}$ of the power transmitting member 18) of the differential portion 11 is continuously changed from a minimum value γ0 min to a maximum value γ0 max, that is, in the continuously-variable shifting state in which the differential portion 11 functions as an electrically controlled continuously-variable transmission the speed ratio γ0 of which is continuously variable from the minimum value γ0 min to the maximum value γ0 max. Thus, the differential portion 11 functions as a continuously-variable transmission mechanism wherein a differential state between the rotating speed of the input shaft 14 and the rotating speed of the power transmitting member 18 is controlled by controlling the operating states of the first electric motor M1, second electric motor M2 and engine 8 that are operatively connected to the power distributing mechanism 16. It will be understood that the power transmitting member 18 functions as an output shaft of the differential portion 11 and also as an input shaft of the automatic transmission portion 20.

The automatic transmission portion 20 is a step-variable automatic transmission which constitutes a part of a power transmitting path between the differential portion 11 and the drive wheels 34. The automatic transmission portion 20 includes a single-pinion type second planetary gear set 26, a single-pinion type third planetary gear set 28 and a single-pinion type fourth planetary gear set 30. Thus, the automatic transmission portion 20 is a multiple-step transmission of a planetary gear type. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear, set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2, ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

Thus, the automatic transmission portion 20 and the differential portion 11 (power transmitting member 18) are selectively connected to each other through one of the first and second clutches C1, C2, which are provided to shift the automatic transmission portion 20. In other words, the first and second clutches C1, C2 function as coupling devices operable to switch a power transmitting path between the power distributing member 18 and the automatic transmission portion 20 (power transmitting path between the differential portion 11 or power transmitting member 18 and the drive wheels 34), to a selected one of a power transmitting state in which a vehicle drive force can be transmitted through the power transmitting path, and a power cut-off state (non-power-transmitting state) in which the vehicle drive force cannot be transmitted through the power transmitting path. When at least one of the first and second clutches C1 and C2 is placed in the engaged state, the power transmitting path is placed in the power transmitting state. When both of the first and second clutches C1, C2 are placed in the released state, the power transmitting path is placed in the power cut-off state. It will be understood that the first and second clutches C1, C2 function as a switching portion operable to switch the power transmitting path between the differential portion 11 and the drive wheels 34, between the power transmitting state and the power cut-off state.

The automatic transmission portion 20 is operable to perform a so-called "clutch-to-clutch" shifting action to establish a selected one of its operating positions (gear positions) by an engaging action of one of coupling devices and a releasing action of another coupling device. The above-indicated operating positions have respective speed ratios γ (rotating speed $N_{18}$ of the power transmitting member 18/rotating speed $N_{OUT}$ of the output shaft 22) which change as geometric series. As indicated in the table of FIG. 2, the first gear position having the highest speed ratio γ1 of about 3.357, for example, is established by engaging actions of the first clutch C1 and third brake B3, and the second gear position having the speed ratio γ2 of about 2.180, for example, which is lower than the speed ratio γ1, is established by engaging actions of the first clutch C1 and second brake B2. Further, the third gear position having the speed ratio γ3 of about 1.424, for example, which is lower than the speed ratio γ2, is established by engaging actions of the first clutch C1 and first brake B1, and the fourth gear position having the speed ratio γ4 of about 1.000, for example, which is lower than the speed ratio γ3, is established by engaging actions of the first clutch C1 and second clutch C2. The reverse gear position having the speed ratio γR of about 3.209, for example, which is intermediate between the speed ratios γ1 and γ2, is established by engaging actions of the second clutch C2 and the third brake B3, and the neutral position N is established when all of the first clutch C1, second clutch C2, first brake B1, second brake B2 and third brake B3 are placed in the released state.

The above-described first clutch C1, second clutch C2, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C1, C2 and brakes B1-B3 is selectively engaged for connecting two members between which each clutch or brake is interposed.

In the transmission mechanism 10 constructed as described above, the differential portion 11 functioning as the continuously-variable transmission and the automatic transmission portion 20 cooperate with each other to constitute a continuously-variable transmission the speed ratio of which is continuously variable. While the differential portion 11 is controlled to hold its speed ratio constant, the differential portion 11 and the automatic transmission portion 20 cooperate to constitute a step-variable transmission the speed ratio of which is variable in steps.

When the differential portion 11 functions as the continuously-variable transmission while the automatic transmission portion 20 connected in series to the differential portion 11 functions as the step-variable transmission, the speed of the rotary motion transmitted to the automatic transmission portion 20 placed in a selected one of the gear positions M (hereinafter referred to as "input speed of the automatic transmission portion 20"), namely, the rotating speed of the power transmitting member 18 (hereinafter referred to as "transmitting-member speed $N_{18}$") is continuously changed, so that the speed ratio of the hybrid vehicle drive system when the automatic transmission portion 20 is placed in the selected gear position M is continuously variable over a predetermined range. Accordingly, an overall speed ratio γT of the transmission mechanism 10 (rotating speed $N_{IN}$ of the input shaft 14/rotating speed $N_{OUT}$ of the output shaft 22) is continuously variable. Thus, the transmission mechanism 10 as a whole is operable as a continuously-variable transmission. The overall speed ratio γT is determined by the speed ratio γ0 of the differential portion 11 and the speed ratio γ of the automatic transmission portion 20.

For example, the transmitting-member speed $N_{18}$ is continuously variable over the predetermined range when the differential portion 11 functions as the continuously-variable transmission while the automatic transmission portion 20 is placed in a selected one of the first through fourth gear positions and reverse gear position as indicated in the table of FIG. 2. Accordingly, the overall speed ratio γT of the transmission mechanism 10 is continuously variable across the adjacent gear positions.

When the speed ratio γ0 of the differential portion 11 is held constant while the clutches C and brakes B are selectively engaged to establish the selected one of the first through fourth gear positions and the reverse gear position, the overall speed ratio γT of the transmission mechanism 10 is variable in step as geometric series. Thus, the transmission mechanism 10 is operable like a step-variable transmission.

When the speed ratio γ0 of the differential portion 11 is held constant at 1, for example, the overall speed ratio γT of the transmission mechanism 10 changes as the automatic transmission portion 20 is shifted from one of the first through fourth gear positions and reverse gear position to another, as indicated in the table of FIG. 2. When the speed ratio γ0 of the differential portion 11 is held constant at a value smaller than 1, for example, at about 0.7, while the automatic transmission portion 20 is placed in the fourth gear position, the overall speed ratio γT of the transmission mechanism 10 is controlled to be about 0.7.

Figure 3:
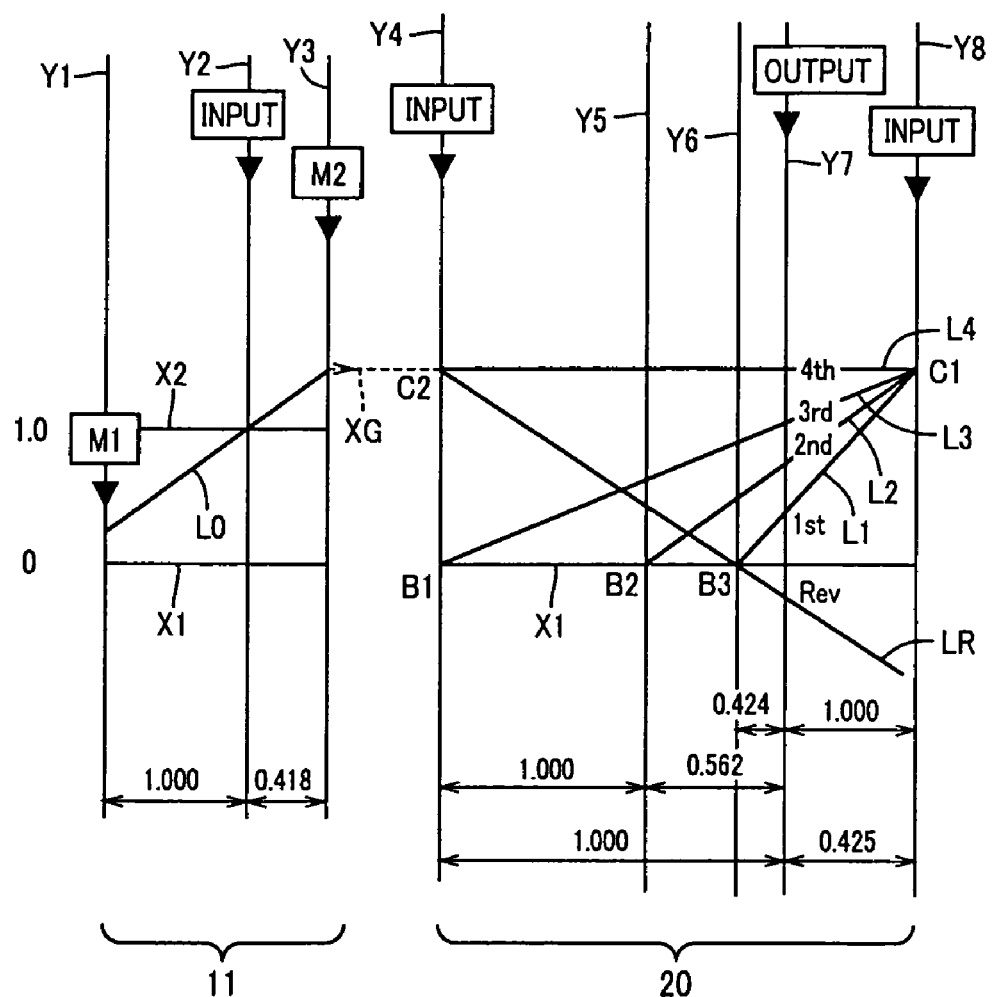
FIG. 3 is a collinear chart indicating relative rotating speeds of rotary elements of an electrically controlled differential portion and the automatic transmission portion of the drive system of FIG. 1.

The collinear chart of FIG. 3 indicates, by straight lines, a relationship among the rotating speeds of the rotary elements in each of the gear positions of the transmission mechanism 10, which is constituted by the differential portion 11 and the automatic transmission portion 20. The different gear positions correspond to respective different states of connection of the rotary elements. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. The horizontal line X1 indicates the rotating speed of 0, while the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8), and the second rotary element RE2 is fixed to the first electric motor M1, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

In the differential state of the differential portion 11 in which the first through third rotary elements RE1-RE3 are rotatable relative to each other, for example, the rotating speed of the first sun gear S1, that is, the rotating speed of the first electric motor M1, which is represented by a point of intersection between the straight line L0 and the vertical line Y1, is raised or lowered by controlling the engine speed $N_E$, so that the rotating speed of the first carrier CA1 represented by a point of intersection between the straight line L0 and the vertical line Y2, if the rotating speed of the first ring gear R1 represented by a point of intersection between the straight line L0 and the vertical line Y3 is substantially held constant.

When the rotating speed of the first electric motor M1 is controlled such that the speed ratio γ0 of the differential portion 11 is held at 1, so that the rotating speed of the first sun gear S1 is made equal to the engine speed $N_E$, the straight line L0 is aligned with the horizontal line X2, so that the first ring gear R1, that is, the power transmitting member 18 is rotated at the engine speed $N_E$. When the rotating speed of the first electric motor M1 is controlled such that the speed ratio γ0 of the differential portion 11 is held at a value lower than 1, for example at 0.7, on the other hand, so that the rotating speed of the first sun gear S1 is zeroed, the power transmitting member 18 is rotated at a speed $N_{18}$ higher than the engine speed $N_E$.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

The automatic transmission portion 20 is placed in the first gear position when the first clutch C1 and the third brake B3 are engaged in the state of the differential portion 11 in which a rotary motion of the differential portion 11 at a speed equal to the engine speed NE is input to the eighth rotary element RE8 of the automatic transmission portion 20. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22.

Figure 4:
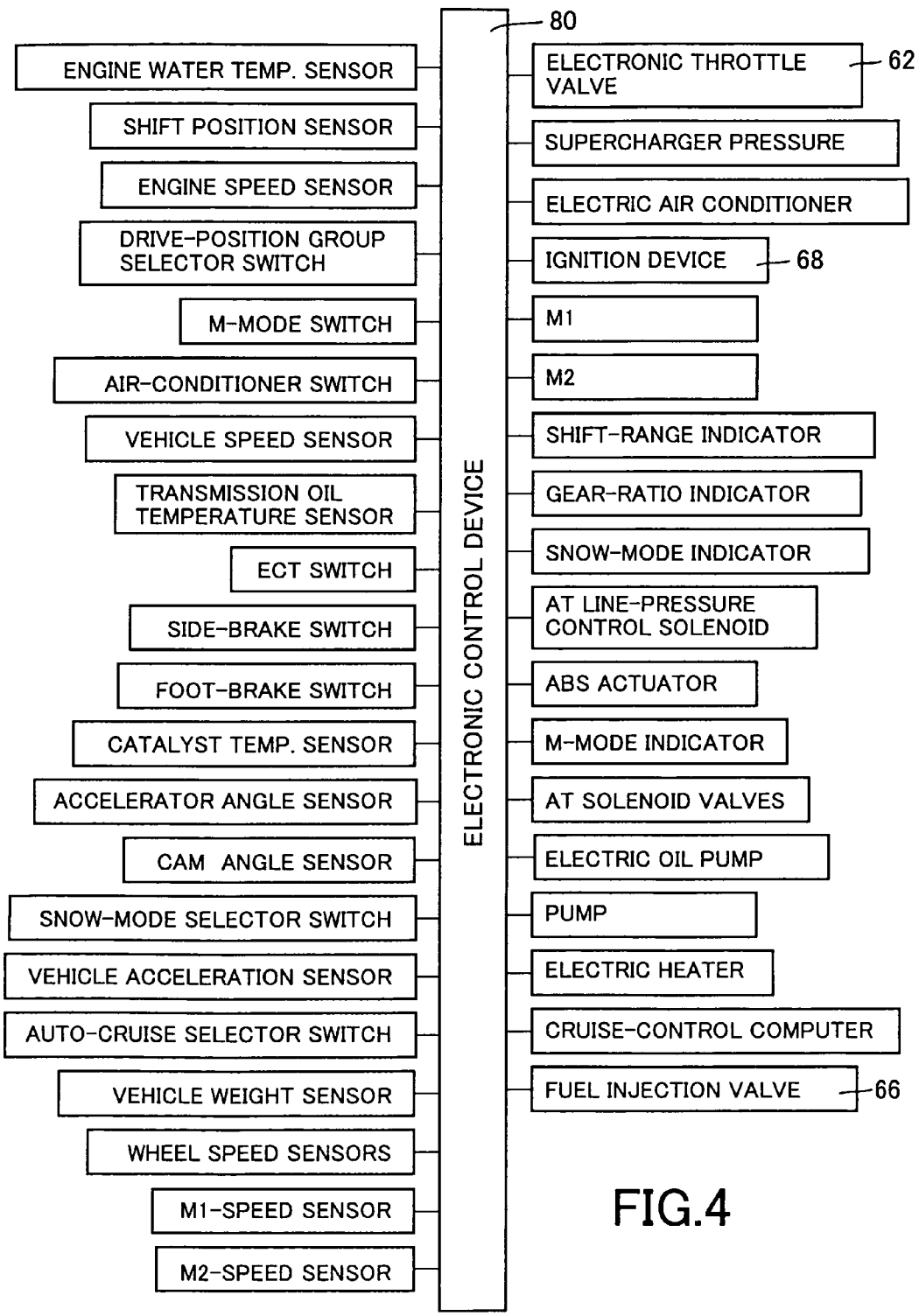
FIG. 4 is a view indicating input and output signals of an electronic control device serving as the control apparatus according to the embodiment of this invention to control the drive system of FIG. 1.

FIG. 4 illustrates signals received by an electronic control device 80 provided to control the transmission mechanism 10, and signals generated by the electronic control device 80. This electronic control device 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first and second electric motors M1 and M2, and drive controls such as shifting controls of the automatic transmission portion 20.

The electronic control device 80 is arranged to receive from various sensors and switches shown in FIG. 4, various signals such as: a signal indicative of a temperature $TEMP_W$ of cooling water of the engine 8; a signal indicative of a selected one of operating positions $P_{SH}$ of a manually operable shifting member in the form of a shift lever 52 (shown in FIG. 6); a signal indicative of the number of operations of the shift lever 52 from a manual forward-drive shifting position M (described below); a signal indicative of the operating speed $N_E$ of the engine 8; a signal indicative of a value indicating a selected group of forward-drive positions of the transmission mechanism 10; a signal indicative of an M mode (manual shifting mode); a signal indicative of an operated state of an air conditioner; a signal indicative of a vehicle speed V corresponding to the rotating speed $N_{OUT}$ of the output shaft 22 (hereinafter referred to as "output shaft speed"); a signal indicative of a temperature $T_{OIL}$ of a working fluid or oil of the automatic transmission portion 20; a signal indicative of an operated state of a side brake; a signal indicative of an operated, state of a foot brake pedal; a signal indicative of a temperature of a catalyst; a signal indicative of a required amount of an output of the vehicle in the form of an amount of operation (an angle of operation) $A_{CC}$ of an accelerator pedal; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the wheels of the vehicle; a signal indicative of a rotating speed $N_{M1}$ of the first electric motor M1 (hereinafter referred to as "first electric motor speed $N_{M1}$, where appropriate); a signal indicative of a rotating speed $N_{M2}$ of the second electric motor M2 (hereinafter referred to as "second electric motor speed $N_{M2}$, where appropriate); and a signal indicative of an amount of electric energy SOC stored in an electric-energy storage device 60 (shown in FIG. 7).

The electronic control device 80 is further arranged to generate various signals such as: control signals to be applied to an engine output control device 58 (shown in FIG. 7) to control the output of the engine 8, such as a drive signal to drive a throttle actuator 64 for controlling an angle of opening $θ_{TH}$ of an electronic throttle valve 62 disposed in an intake pipe 60 of the engine 8, a signal to control an amount of injection of a fuel by a fuel injecting device 66 into the intake pipe 60 or cylinders of the engine 8, a signal to be applied to an ignition device 68 to control the ignition timing of the engine 8, and a signal to adjust a supercharger pressure of the engine 8; a signal to operate the electric air conditioner; signals to operate the first and second electric motors M1 and M2; a signal to operate a shift-range indicator for indicating the selected operating or shift position of the shift lever 52; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves in the form of linear solenoid valves incorporated in a hydraulic control unit 70 (shown in FIG. 7) provided to control the hydraulic actuators of the hydraulically operated frictional coupling devices of the differential portion 11 and automatic transmission portion 20; a signal to operate a regulator valve incorporated in the hydraulic control unit 70, to regulate a line pressure PL; a signal to control an electrically operated oil pump which is hydraulic pressure source for generating a hydraulic pressure that is regulated to the line pressure PL; and a signal to drive an electric heater; a signal to be applied to a cruise-control computer.

Figure 5:
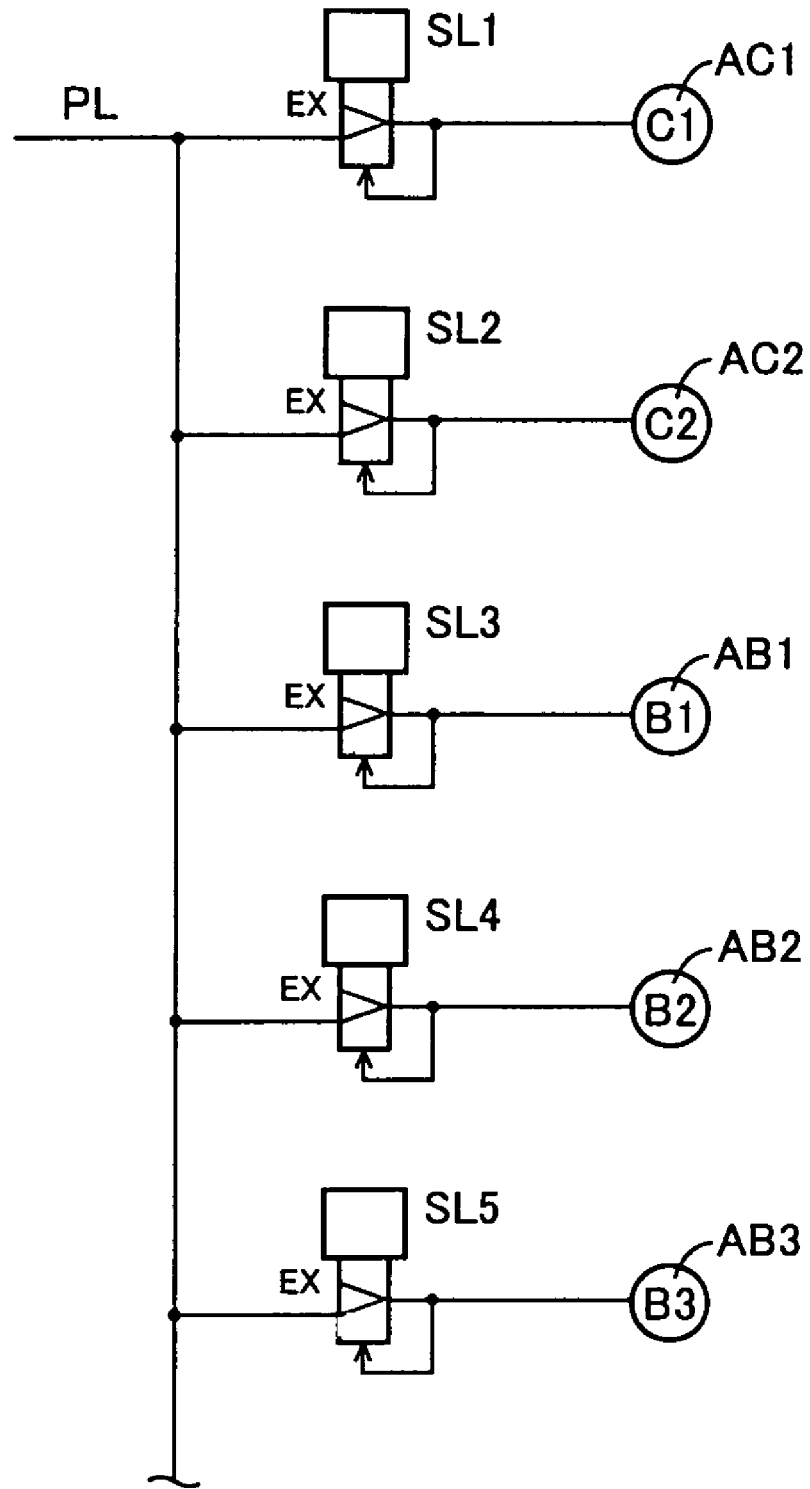
FIG. 5 is a circuit diagram showing hydraulic actuators provided in a hydraulic control unit, for operating clutches C and brakes B incorporated in the automatic transmission portion, and linear solenoid valves for controlling the hydraulic actuators.

FIG. 5 shows a hydraulic circuit of the hydraulic control unit 70 arranged to control linear solenoid valves SL1-SL5 for controlling hydraulic actuators (hydraulic cylinders) AC1, AC2, AB1, AB2 and AB3 for actuating the clutches C1, C2 and brakes B1-B3.

As shown in FIG. 5, the hydraulic actuators AC1, AC2, AB1, AB2, AB3 are connected to the respective linear solenoid valves SL1-SL5, which are controlled according to control commands from the electronic control device 80, for adjusting the line pressure PL into respective engaging pressures PC1, PC2, PB1, PB2 and PB3 to be applied directly to the respective hydraulic actuators AC1, AC2, AB1, AB2, AB3. The line pressure PL is a pressure which is generated by the mechanical oil pump 40 driven by the engine 8 or the electric oil pump 76 provided in addition to the mechanical oil pump 40, and which is regulated by a relief-type pressure regulator valve according to a load of the engine 8 as represented by the operation amount $A_{CC}$ of the accelerator pedal or the opening angle $\theta_{TH}$ of the electronic throttle valve 62, for example.

The linear solenoid valves SL1-SL5 have substantially the same construction, and are controlled independently of each other by the electronic control device 80, to adjust the hydraulic pressures of the hydraulic actuators AC1, AC2, AB1, AB2, AB3 independently of each other, for controlling the engaging pressures PC1, PC2, PB1, PB2, PB3, so that the appropriate two coupling devices (C1, C2, B1, B2, B3) are engaged to shift the automatic transmission portion 20 to the selected operating position or gear position. A shifting action of the automatic transmission portion 20 from one position to another is a so-called "clutch-to-clutch" shifting action involving an engaging action of the coupling devices (C, B) and a releasing action another of the coupling devices, which take place concurrently.

Figure 6:
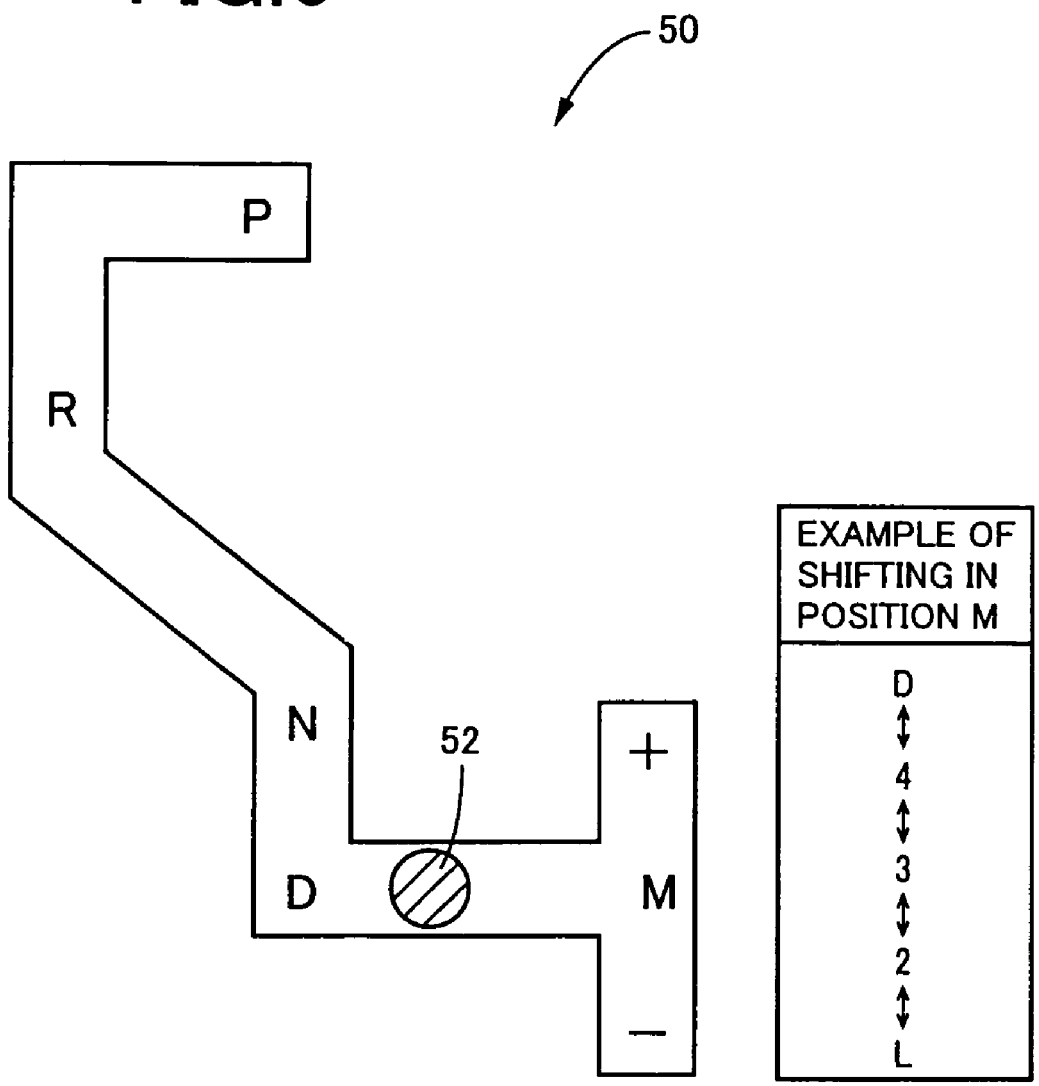
FIG. 6 is a view showing an example of a manually operated shifting device including a shift lever and operable to select one of a plurality of shift positions.

FIG. 6 shows an example of a manually operable shifting device in the form of a shifting device 50. The shifting device 50 includes the above-described shift lever 52, which is disposed laterally adjacent to an operator's seat of the vehicle, for example, and which is manually operated to select one of the plurality of operating positions $P_{SH}$. It will be understood that the shifting device 50 functions as a switching portion configured to switch the power transmitting path between the power transmitting state and the power cut-off state.

The operating positions $P_{SH}$ of the shift lever 52 consists of: a parking position P for placing the transmission mechanism 10 (namely, automatic transmission portion 20) in a neutral state (power cut-off state) in which a power transmitting path through the automatic transmission portion 20 is disconnected while at the same time the output shaft 22 is placed in the locked state; a reverse-drive position R for driving the vehicle in the rearward direction; a neutral position N for placing the transmission mechanism 10 in the neutral state; an automatic forward-drive shifting position D for establishing an automatic shifting mode; and the above-indicated manual forward-drive shifting position M for establishing a manual shifting mode. In the automatic shifting mode, the overall speed ratio γT is determined by the continuously variable speed ratio of the differential portion 11 and the speed ratio of the automatic transmission portion 20 which changes in steps as a result of an automatic shifting action of the automatic transmission portion 20 from one of the first through fourth gear positions to another. In the manual shifting mode, the number of the gear positions available is limited by disabling the automatic transmission portion 20 to be shifted to the relatively high gear position or positions.

As the shift lever 52 is operated to a selected one of the operating positions $P_{SH}$, the hydraulic control unit 70 is electrically operated to switch the hydraulic circuit to establish the rear-drive position R, neutral position N, and one of the forward-drive first through fourth gear positions, as indicated in the table of FIG. 2.

The above-indicated parking position P and the neutral position N are power cut-off positions (non-drive positions) selected when the vehicle is not driven, while the above-indicated reverse-drive position R, and the automatic and manual forward-drive positions D, M are power transmitting positions (drive positions) selected when the vehicle is driven. In the non-drive positions P, N, the power transmitting path in the automatic transmission portion 20 is in the power cut-off state established by releasing both of the clutches C1 and C2, as shown in the table of FIG. 2. In the drive positions R, D, M, the power transmitting path in the automatic transmission portion 20 is in the power transmitting state established by engaging at least one of the clutches C1 and C2, as also shown in the table of FIG. 2.

Described in detail, a manual operation of the shift lever 52 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 52 from the neutral position N to the automatic forward-drive position D causes at least the first clutch C1 to be engaged for switching the power transmitting path in the automatic transmission portion 20 from the power-cut-off state to the power-transmitting state. A manual operation of the shift lever 52 from the rear-drive position R to the parking position P or neutral position N cause the second clutch C2 to be released for switching the power transmitting path in the automatic transmission portion 20 from the power-transmitting state to the power-cut-off state. A manual operation of the shift lever 52 from the automatic forward-drive position D to the neutral position N causes the first clutch C1 and the second clutch C2 to be released for switching the power transmitting path from the power-transmitting state to the power-cut-off state.

Figure 8:
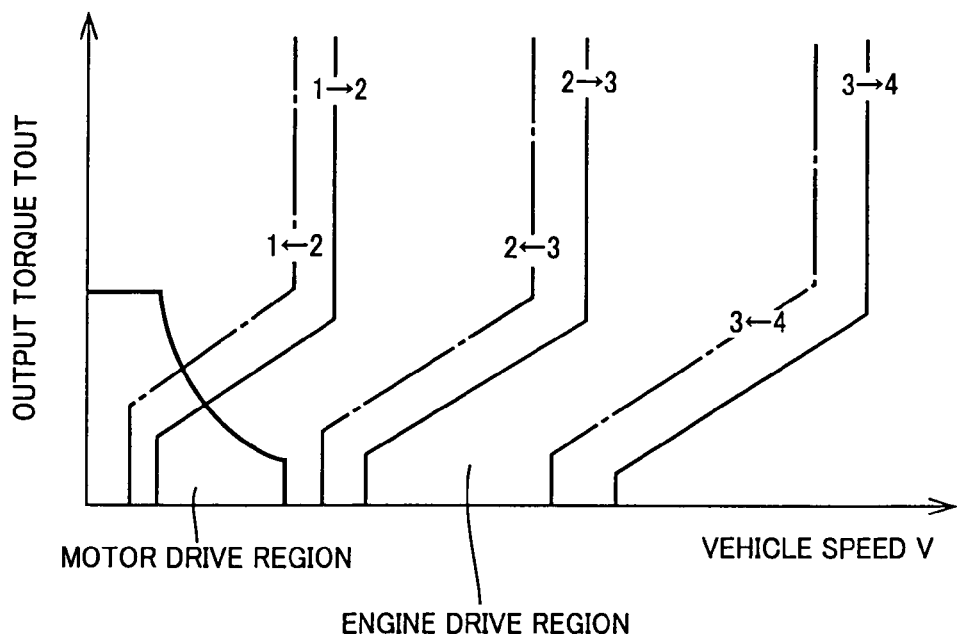
FIG. 8 is a view illustrating an example of a stored shifting boundary line map used for determining a shifting action of the automatic transmission portion, and an example of a stored drive-power-source switching boundary line map used for switch a vehicle drive mode between an engine drive mode and a motor drive mode, the shifting and switching boundary line maps being defined in the same two-dimensional coordinate system, in relation to each other.

Referring to the functional block diagram of FIG. 7, the electronic control device 80 (functioning as the control apparatus of the present invention) includes a step-variable shifting control portion 82, a hybrid control portion 84, an excessive speed preventing portion 86, a shift-position determining portion 88, and an electric-motor-speed determining portion 90. The step-variable shifting control portion 82 is configured to determine whether a shifting action of the automatic transmission portion 20 should take place, that is, to determine the gear position to which the automatic transmission portion 20 should be shifted. This determination is made on the basis of a condition of the vehicle represented by the actual vehicle running speed V and the actual output torque $T_{OUT}$ of the automatic transmission portion 20, and according to a stored shifting boundary line map (shifting control map or relation) which represents shift-up boundary lines indicated by solid lines in FIG. 8 and shift-down boundary lines indicated by one-dot chain lines in FIG. 8.

The step-variable shifting control portion 82 generates a shifting command (hydraulic control command) to be applied to the hydraulic control unit 70, to engage and release the appropriate two hydraulically operated frictional coupling devices (C1, C2, B1, B2, B3), for establishing the determined gear position of the automatic transmission portion 20 according to the table of FIG. 2. Described in detail, the step-variable shifting control portion 82 commands the hydraulic control unit 70 to control the appropriate two linear solenoid valves SL incorporated in the hydraulic control unit 70, for activating the appropriate hydraulic actuators of the appropriate two frictional coupling devices (C, B) to concurrently engage one of the two frictional coupling devices and release the other frictional coupling device, to effect the clutch-to-clutch shifting action of the automatic transmission portion 20 to the determined gear position.

The hybrid control portion 84 controls the engine 8 to be operated with high efficiency, and controls the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio $\gamma 0$ of the differential portion 11 operating as the electric continuously-variable transmission. For instance, the hybrid control portion 84 calculates a target (required) vehicle output at the present running speed V of the vehicle, on the basis of the operation amount $A_{CC}$ of the accelerator pedal 74 used as an operator's required vehicle output and the vehicle running speed V, and calculate a target total vehicle output on the basis of the calculated target vehicle output and a required amount of generation of an electric energy by the first electric motor M1. The hybrid control portion 84 calculates a target output of the engine 8 to obtain the calculated target total vehicle output, while taking account of a power transmission loss, a load acting on various devices of the vehicle, an assisting torque generated by the second electric motor M2, etc. The hybrid control portion 84 controls the speed $N_E$ and torque $T_E$ of the engine 8, so as to obtain the calculated target engine output, and the amount of generation of the electric energy by the first electric motor M1.

Figure 9:
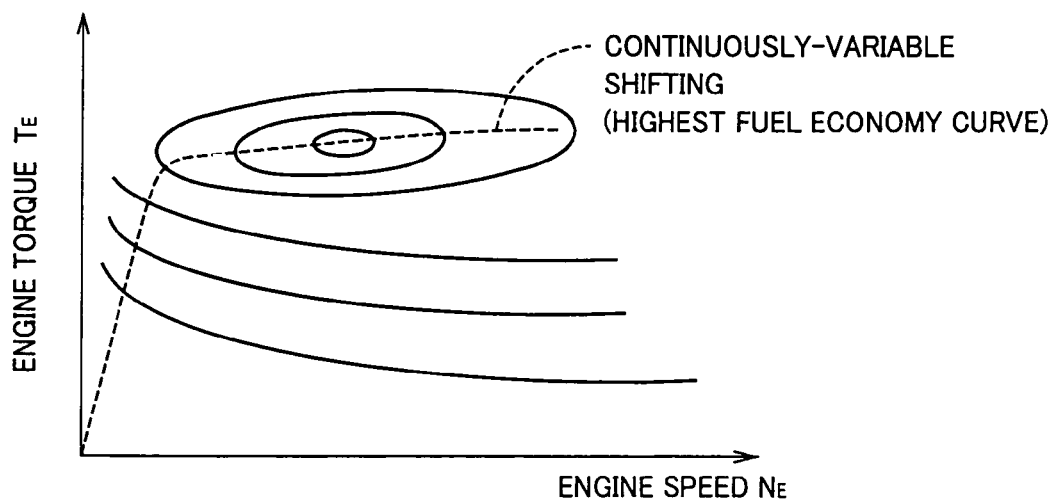
FIG. 9 is a view illustrating an example of a fuel consumption map defining a highest-fuel-economy curve of an engine (indicated by broken line)

The hybrid control portion 84 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electric continuously-variable transmission, for optimum coordination of the engine speed $N_E$ for its efficient operation, and the rotating speed of the power transmitting member 18 determined by the vehicle speed V and the selected gear position of the transmission portion 20. That is, the hybrid control portion 82 determines a target value of the overall speed ratio $\gamma T$ of the transmission mechanism 10, so that the engine 8 is operated according to a stored highest-fuel-economy curve (fuel-economy map or relation) indicated by broken line in FIG. 9. The target value of the overall speed ratio $\gamma T$ of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 82 controls the speed ratio $\gamma 0$ of the differential portion 11, so as to obtain the target value of the overall speed ratio $\gamma T$, so that the overall speed ratio $\gamma T$ can be controlled within a predetermined range.

In the hybrid control, the hybrid control portion 84 controls an inverter 54 such that the electric energy generated by the first electric motor M1 is supplied to an electric-energy storage device 56 and the second electric motor M2 through the inverter 54. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 54 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy.

The hybrid control portion 84 is further arranged to hold the engine speed $N_E$ substantially constant or at a desired value, by controlling the first electric motor speed $N_{M1}$ and/or the second electric motor speed $N_{M2}$ owing to the electric CVT function of the differential portion 11, irrespective of whether the vehicle is stationary or running. In other words, the hybrid control portion 84 is capable of controlling the first electric motor speed $N_{M1}$ as desired while holding the engine speed $N_E$ substantially constant or at a desired value. For example, the hybrid control portion 84 raises the engine speed $N_E$ by raising the first electric motor speed $N_{M1}$ during running of the vehicle while the second electric motor speed $N_{M2}$ determined by the vehicle running speed V (rotating speed of the drive wheels 34) is held substantially constant.

To raise the engine speed $N_E$ during running of the vehicle, for example, the hybrid control portion 84 raises the first electric motor speed $N_{M1}$ while the second electric motor speed $N_{M2}$ determined by the vehicle speed V (rotating speed of the drive wheels 34) is held substantially constant, as is apparent from the collinear chart of FIG. 3. To hold the engine speed $N_E$ substantially constant during a shifting action of the automatic transmission portion 20, the hybrid control portion 84 changes the first electric motor speed $N_{M1}$ in a direction opposite to a direction of change of the second electric motor speed $N_{M2}$ due to the shifting action of the automatic transmission portion 20.

The hybrid control portion 84 includes engine output control means functioning to command the engine-output control device 58 for controlling the engine 8, so as to provide a required output, by controlling the throttle actuator 64 to open and close the electronic throttle valve 62, and controlling an amount and time of fuel injection by the fuel injecting device 66 into the engine 8, and/or the timing of ignition of the igniter by the ignition device 68, alone or in combination.

For instance, the hybrid control portion 84 is basically arranged to control the throttle actuator 64 on the basis of the operation amount $A_{CC}$ of the accelerator pedal and according to a predetermined stored relationship (not shown) between the operation amount $A_{CC}$ and the opening angle $\theta_{TH}$ of the electronic throttle valve 62 such that the opening angle $\theta_{TH}$ increases with an increase of the operation amount $A_{CC}$. The engine output control device 58 controls the throttle actuator 64 to open and close the electronic throttle valve 62, controls the fuel injecting device 66 to control the fuel injection, and controls the ignition device 68 to control the ignition timing of the igniter, for thereby controlling the torque of the engine 8, according to the commands received from the hybrid control portion 84.

The hybrid control portion 84 is capable of establishing a motor-drive mode to drive the vehicle by the electric motor, by utilizing the electric CVT function (differential function) of the differential portion 11, irrespective of whether the engine 8 is in the non-operated state or in the idling state. For example, the hybrid control portion 84 establishes the motor-drive mode, when the operating efficiency of the engine 8 is relatively low, or when the vehicle speed V is comparatively low or when the vehicle is running in a low-load state. For reducing a dragging of the engine 8 in its non-operated state and improving the fuel economy in the motor-drive mode, the hybrid control portion 84 is configured to hold the engine speed $N_E$ at zero or substantially zero as needed, owing to the electric CVT function (differential function) of the differential portion 11, that is, by controlling the differential portion 11 to perform its electric CVT function, so that the first electric motor speed $N_{M1}$ is controlled to be in a non-load state, so as to be freely rotated to have a negative speed $N_{M1}$.

The hybrid control portion 84 is further capable of performing a so-called "drive-force assisting" operation (torque assisting operation) to assist the engine 8, even in the engine-drive region of the vehicle condition, by supplying an electric energy from the first electric motor M1 or the electric-energy storage device 60 to the second electric motor M2 through the above-described electric path, so that the second electric motor M2 is operated to transmit a drive torque to the drive wheels 34.

The hybrid control portion 84 is further configured to place the first electric motor M1 in a non-load state in which the first electric motor M1 is freely rotated, so that the differential portion 11 is placed in a state similar to the power cut-off state in which power cannot be transmitted through the power transmitting path within the differential portion 11, and no output can be generated from the differential portion 11. Namely, the hybrid control portion 84 is arranged to place the first electric motor M1 in the non-load state, for thereby placing the differential portion 11 in a neutral state in which the power transmitting path is electrically cut off.

When the shifting device 50 is operated to select the neutral position N or parking position P during running of the vehicle by the engine 8, the automatic transmission portion 20 is placed in the power cut-off state, so that a load is not transmitted from the drive wheels 34 to the differential portion 11 through the automatic transmission portion 20. As a result, the rotating speed $N_{18}$ of the power transmitting member 18 functioning as the output shaft of the differential portion 11 and the input shaft of the automatic transmission portion 20 is abruptly raised, giving rise to a risk of deterioration of the durability of the second electric motor M2 connected to the differential portion 11 and power transmitting member 18. The above-indicated excessive speed preventing portion 86 is provided to prevent an excessive rise of the rotating speed $N_{18}$ of the power transmitting member 18, for thereby preventing deterioration of the durability of the rotary elements of the differential portion 11 and second electric motor M2.

The excessive speed preventing portion 86 operates according to results of determinations by the above-indicated shift-position determining portion 88 and electric-motor-speed determining portion 90. The shift-position determining portion 88 is configured to determine whether the shifting device 52 has generated a shift-position selecting signal which selects the neutral position N or parking position P. When the shift-position determining portion 88 determines that this shift-position selecting signal has been generated from the shifting device 50, the frictional coupling devices such as the first clutch C1 that have been engaged to establish the power transmitting gear positions (to place the power transmitting path in the power transmitting state) are expected to be disengaged with reduction of the pressure of the working pressure applied thereto. In this case, the excessive speed preventing portion 86 is operated to implement a fail-safe control by preventing an excessive rise of the rotating speed of the power transmitting member 18.

The electric-motor-speed determining portion 90 is configured to detect the operating speed N of the second electric motor M2 and determine whether the detected second electric motor speed NM2 is equal to or higher than a predetermined upper limit. For example, the second electric motor speed $N_{M2}$ is detected by a speed sensor in the form of a resolver provided for the second electric motor M2. The predetermined upper limit of the second electric motor M2, which is about 5000 rpm, for instance, varies depending upon the specific configuration of the transmission mechanism 10. For example, the predetermined upper limit is determined by conducting a durability test of the vehicle, as a permissible highest value of the rotating speed $N_{18}$ of the power transmitting member 18 upon switching of the shift lever 52 to the neutral position N, below which the rotary elements of the differential portion 11 and the second electric motor M2 can be protected against deterioration of their durability.

The excessive speed preventing portion 86 operates to limit the rotating speed of the power transmitting member 18 and the operating speeds of the second electric motor M2 and differential portion 11, when the shift-position determining portion 88 determines that the non-drive position (power cut-off position) in the form of the neutral position N or parking position P is established, and when the electric-motor-speed determining portion 90 determines that the detected operating speed $N_{M2}$ of the second electric motor M2 is equal to or higher than the predetermined upper limit.

Described in detail, the excessive speed preventing portion 86 is configured to limit the output of the engine 8, for limiting the rotating speed $N_{18}$ of the power transmitting member 18 functioning as the output shaft of the differential portion 11 and the input shaft of the automatic transmission portion, 20 and for limiting the operating speed $N_{M2}$ of the second electric motor M2 which is fixed to the power transmitting member 18 and rotated with the power transmitting member 18. Described more specifically, the excessive speed preventing portion 86 implements a fuel cut control of cutting off or reducing a supply of a fuel to the engine 8, for thereby limiting the output of the engine 8. When the output of the engine 8 is limited by the fuel cut control, for example, a reaction torque of the first electric motor M1 is reduced, and the torque of the power transmitting member 18 is also reduced, whereby the rise of the rotating speed of the power transmitting member 18 is restricted or limited, so that the rotating speed $N_{18}$ of the power transmitting member 18 is limited, whereby the excessive rise of the rotating speed N18 is prevented.

The output of the engine 8 can also be limited by controlling the opening angle $\theta_{TH}$ of the electronic throttle valve 62, for example, by setting an upper limit of the opening angle $\theta_{TH}$. In this case, too, the output of the engine 8 can be limited to prevent the excessive rise of the rotating speed $N_{18}$ of the power transmitting member 18.

Figure 10:
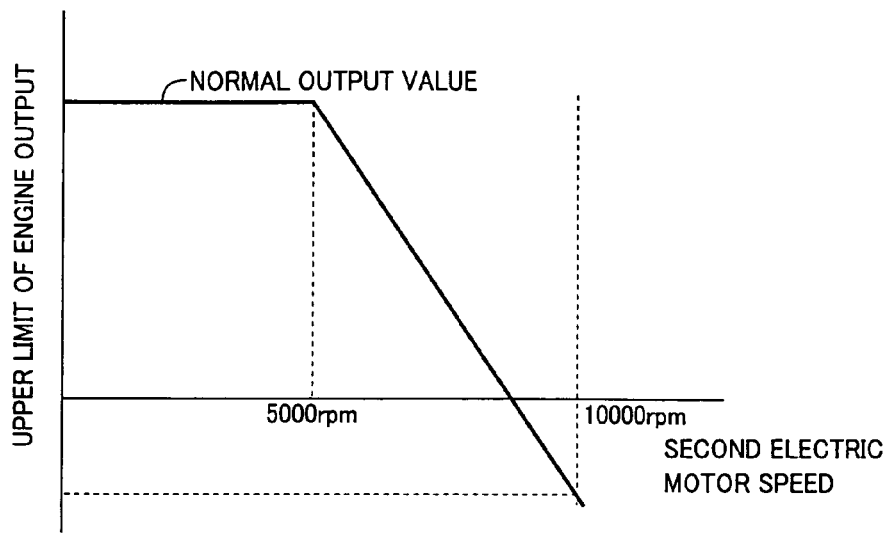
FIG. 10 is a view indicating an example of an engine output limiting map for controlling the output of the engine.

An upper limit of the output of the engine 8 is changed according to the rotating speed $N_{M2}$ of the second electric motor M2. FIG. 10 indicates an example of an engine output limiting map used for controlling the output of the engine 8. According to this engine output limiting map wherein the upper limit of the second electric motor speed $N_{M2}$ is set to be 5000 rpm, the output of the engine 8 is not limited until the second electric motor speed $N_{M2}$ exceeds 5000 rpm. The output of the engine 8 is continuously or gradually reduced with a rise of the second electric motor speed $N_{M2}$ beyond the upper limit of 5000 rpm. Thus, an amount of limitation of the output of the engine 8 increases with a rise of the second electric motor speed $N_{M2}$ and a rise of the rotating speed $N_{18}$ of the power transmitting member 18. Accordingly, the torque of the power transmitting member 18 is adequately reduced, and a rise of the rotating speed N18 is limited according to the rise of the rotating speed $N_{18}$ beyond the upper limit. Thus, the output of the engine 8 is limited according to the operating speed $N_{M2}$ of the second electric motor M2, according to the engine output limiting map of FIG. 10. During running of the vehicle at a relatively low speed, for instance, the output of the engine 8 is not limited to prevent excessive rises of the speeds of the differential portion 11, second electric motor M2 and power transmitting member 18, while at the same time the shifting action from the drive position D to the neutral position N can be normally implemented. During running of the vehicle at a relatively high speed, on the other hand, the output of the engine 8 is limited to effectively prevent the excessive rises of the speeds of the differential portion 11, second electric motor M2 and power transmitting member 18.

Figure 11:
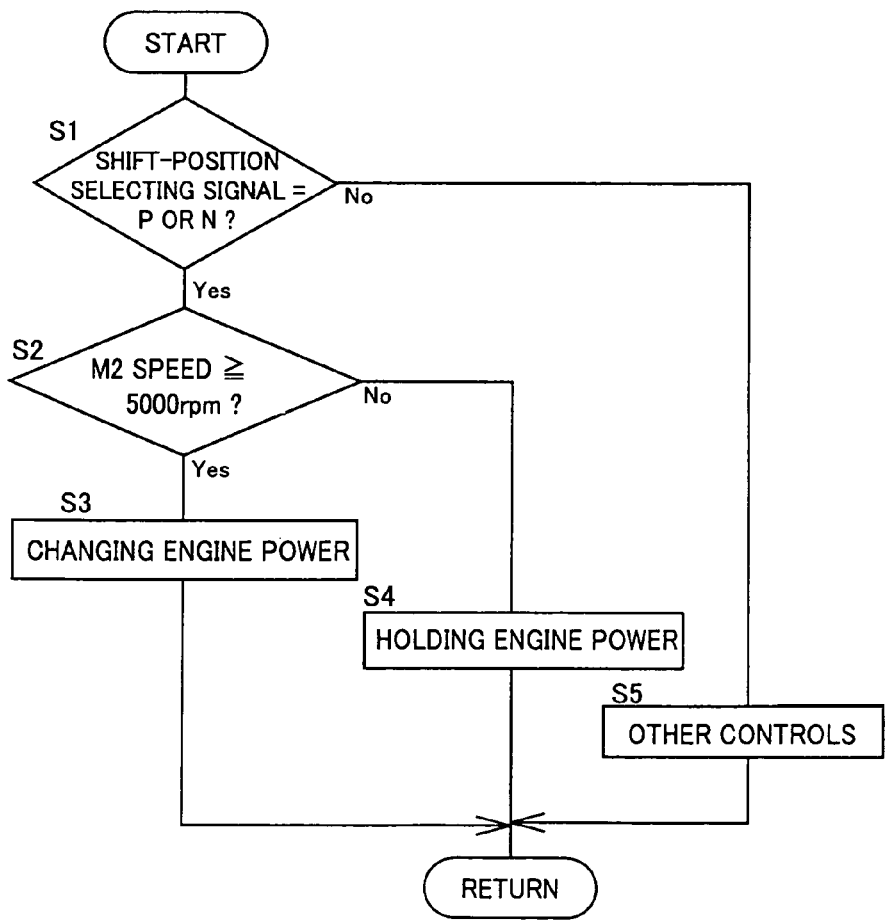
FIG. 11 is a flow chart illustrating a control routine executed by the electronic control device of FIG. 4, for preventing excessive speeds of a power transmitting member and a second electric motor of the drive system by limiting the output of the engine.

Referring next to the flow chart of FIG. 11, there is illustrated a control routine executed by the electronic control device 40 to prevent the excessive rises of the speeds of the differential portion 11 and second electric motor M2 upon switching of the shift lever 52 to the neutral position N during running of the vehicle by the engine 8. This control routine is repeatedly executed with an extremely short cycle time of several milliseconds to several tens of milliseconds.

The control routine is initiated with step S1 corresponding to the shift-position determining portion 88, to determine whether the shifting device 50 has generated the shift-position selecting signal for selecting or establishing the neutral position N or parking position P. If a negative determination is obtained in step S1, the control flow goes to step S5 in which a shifting control or any other control not associated with the limitation of the engine output is implemented.

When an affirmative determination is obtained in step S1, the control flow goes to step S2 corresponding to the electric-motor-speed determining portion 90, to determine whether the detected operating speed $N_{M2}$ of the second electric motor M2 is equal to higher than the predetermined upper limit of 5000 rpm. If a negative determination is obtained in step S2, this indicates that the second electric motor speed $N_{M2}$ and the rotating speed $N_{18}$ of the power transmitting member 18 will not exceed the predetermined upper limit, and the control flow goes to step S4 in which the output of the engine 8 is held at the present value. In this case, one execution of the control routine is terminated with implementation of step S4.

When an affirmative determination is obtained in step S2, the control flow goes to step S3 corresponding to the excessive speed preventing portion 86, to limit the output of the engine 8, for thereby limiting rises of the speeds of the second electric motor M2 and power transmitting member 18. For instance, the output of the engine 8 is limited by at least one of the fuel cut control and the reduction of the operating angle $\theta_{TH}$ of the electronic throttle valve 62.

The control apparatus in the form of the electronic control device 80 according to the present embodiment of the invention is configured such that the excessive speed preventing portion 86 is operated to limit the rotating speed $N_{18}$ of the power transmitting member 18 functioning as the output shaft of the differential portion 11 and the operating speed $N_{M2}$ of the second electric motor M2, upon determination by the shift-position determining portion 88 that the power transmitting path between the power transmitting member 18 and the drive wheels 34 is switched by the switching portion in the form of the shifting device 50 from the power transmitting state to the power cut-off state. Accordingly, the control apparatus prevents an excessive rise of the rotating speed $N_{18}$ of the power transmitting member 18, making it possible to prevent the deterioration of the durability of the rotary elements of the differential portion 11 and the second electric motor M2.

The present embodiment is further configured to limit the output of the engine 8 for reducing the torque of the power transmitting member 18. The reduction of the torque of the power transmitting member 18 results in preventing excessive rises of the rotating speed $N_{18}$ of the power transmitting member 18 and the operating speed $N_{M2}$ of the second electric motor M2 connected to the power transmitting member 18.

The present embodiment is arranged such that the amount of limitation of the output of the engine 8 is larger when the operating speed $N_{M2}$ of the second electric motor M2 is relatively high than when the operating speed $N_{M2}$ is relatively low. According to this arrangement, the output of the engine 8 is not limited, during running of the vehicle at a relatively low speed (with the second electric motor speed $N_{M2}$ being lower than the upper limit of 5000 rpm), to prevent excessive rises of the speeds of the differential portion 11, second electric motor M2 and power transmitting member 18, while at the same time the shifting action from the drive position D to the neutral position N can be normally implemented. During running of the vehicle at a relatively high speed, on the other hand, the output of the engine 8 is limited to effectively prevent the excessive rises of the speeds of the differential portion 11, second electric motor M2 and power transmitting member 18.

The present embodiment is further configured to implement the fuel cut control of the engine 8 to limit the output of the engine 8, so that the torque of the power transmitting member 18 is reduced to limit the speeds of the power transmitting member 18 and second electric motor M2.

The present embodiment may be alternately configured to set the upper limit of the angle of opening $\theta_{TH}$ of the electronic throttle valve 62 of the engine 8, to limit the output of the engine, so that the torque of the power transmitting member 18 is reduced to limit the speeds of the power transmitting member 18 and second electric motor M2.

The present embodiment is further arranged such that the shifting device 50 including the shift lever 52 switches the automatic transmission portion 20 constituting a part of the power transmitting path, between the power transmitting state and the power cut-off state, according to an operation of the shift lever 52 having the plurality of shift positions $P_{SH}$ including the power cut-off positions in the form of the neutral and parking positions N, P.

In the illustrated transmission mechanism 10, the electrically controlled differential portion 11 is operable as a continuously-variable transmission by controlling the operating state of the first electric motor M1, so that the vehicle drive torque can be smoothly changed. It is noted that the differential portion is operable not only as an electrically controlled continuously-variable transmission the speed ratio of which is continuously variable, but also as a step-variable transmission the speed ratio of which is variable in steps so that the overall speed ratio of the transmission mechanism 10 can be changed to rapidly change the vehicle drive torque.

The present embodiment is further configured such that the shift-position determining portion 88 determines whether the shifting device 52 has generated the shift-position selecting signal selecting the neutral position N or parking position P. When the shift-position determining portion 88 determines that this shift-position selecting signal has been generated from the shifting device 50, the frictional coupling devices such as the first clutch C1 that have been engaged to establish the power transmitting gear positions (to place the power transmitting path in the power transmitting state) are expected to be disengaged with reduction of the pressure of the working pressure applied thereto. However, the excessive speed preventing portion 86 is operated to implement the fail-safe control by preventing an excessive rise of the rotating speed of the power transmitting member 18.

Figure 12:
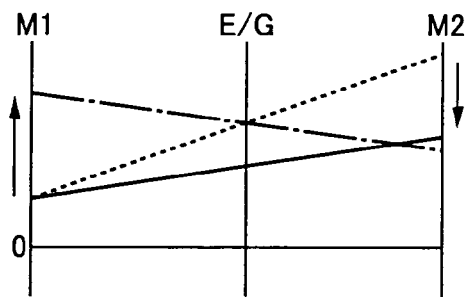
FIG. 12 is a collinear chart indicating relative rotating speeds of the rotary elements of the electrically controlled differential portion, for explaining a control apparatus according to a second embodiment of this invention which is configured to prevent excessive speeds of the power transmitting member and the second electric motor, by controlling a first electric motor.
Figure 13:
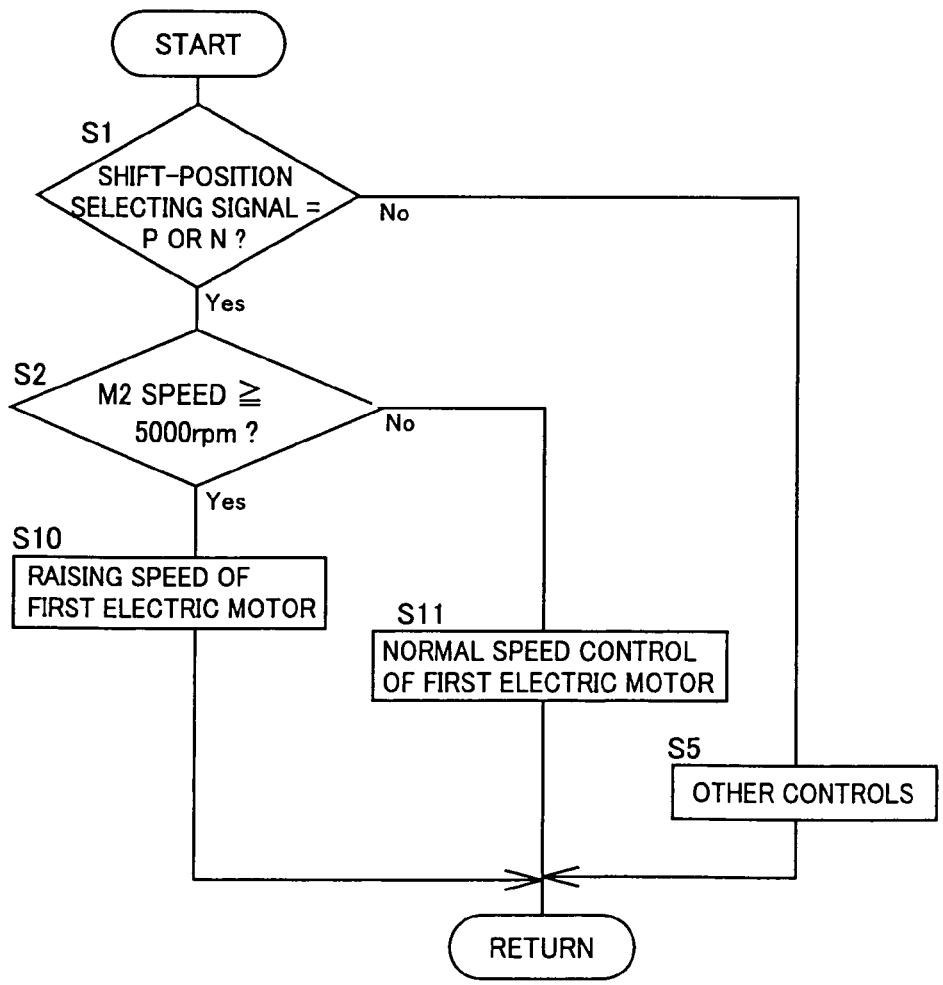
FIG. 13 is a flow chart illustrating a control routine executed by the electronic control device of FIG. 4, for preventing the excessive speeds of the power transmitting member and the second electric motor, by controlling the first electric motor.

Referring next to FIGS. 12 and 13, there will be described the second embodiment of this invention. The same reference signs as used in the first embodiment will be used in the second embodiment, to identify the same elements which will not be described.

The excessive speed preventing portion 86 may prevent excessive rises of the speeds of the second electric motor M2 and power transmitting member 18, by suitably controlling the speed $N_{M1}$ of the first electric motor M1. FIG. 12 is a collinear chart indicating relative rotating speeds of the rotary elements of the differential portion 11. Solid straight line in the collinear chart indicates an example of the rotating speeds of the rotary elements during running of the vehicle by the engine 8, that is, in the power transmitting state of the automatic transmission portion 20 with the shift lever 52 placed in the automatic forward-drive position D, for example. When the power transmitting path through the automatic transmission portion 20 is switched to the power cut-off state with the shift lever 52 operated to the neutral position N, for instance, a running load which has been transmitted to the power transmitting member 18 from the drive wheels 34 through the automatic transmission portion 20 is no longer transmitted to the power transmitting member 18, so that the operating speeds of the engine 8 and second electric motor M2 are abruptly raised, as indicated by broken line in FIG. 12, giving rise to a risk of excessive rises of the speeds of the second electric motor M2 and power transmitting member 18. In this case, the excessive speed preventing portion 86 raises the operating speed $N_{M1}$ of the first electric motor M1 to lower the speeds of the second electric motor M2 and power transmitting member 18, as indicated by one-dot chain line, for thereby preventing the excessive rises of their speeds.

The flow chart of FIG. 13 illustrates a control routine executed by the electronic control device 80 in the present second embodiment, to prevent excessive rises of the speeds of the differential portion 11 and second electric motor M2 when the shift lever 52 is operated to the neutral position N. This control routine is repeatedly executed with an extremely short cycle time of several milliseconds to several tens of milliseconds.

Steps S1, S2 and S5 of the control routine of the flow chart of FIG. 13 are identical with the corresponding steps of the control routine of the flow chart of FIG. 11. If a negative determination is obtained in step S2, the control flow goes to step S11 in which the first electric motor M1 is controlled in the normal manner, and one cycle of execution of the control routine is terminated with completion of step S11. If an affirmative determination is obtained in step S2, the control flow goes to step S10 corresponding to the excessive speeds preventing portion 86, in which the operating speed $N_{M1}$ of the first electric motor M1 is raised, to limit the operating speed $N_{M2}$ of the second electric motor M2, for thereby preventing an excessive rise of the operating speed $N_{M2}$.

The control apparatus in the form of the electronic control device 80 arranged to execute the control routine of FIG. 13 according to the second embodiment is configured to control the operating speed $N_{M1}$ of the first electric motor M1 for thereby limiting the operating speed $N_{M2}$ of the second electric motor M2 (rotating speed $N_{18}$ of the power transmitting member 18), to prevent the excessive rises of the speeds of the second electric motor M2 and power transmitting member 18.

While the preferred embodiments of this invention have been described in detail by reference to the accompanying drawings, it is to be understood that the present invention may be otherwise embodied.

In the illustrated embodiments, the excessive speed preventing portion 86 is configured to limit the output of the engine 8 or raise the operating speed $N_{M1}$ of the first electric motor M1, for thereby limiting the rotating speed of the power transmitting member 18 which functions as the output shaft of the differential portion 11 and the input shaft of the automatic transmission portion 20. However, the excessive speed preventing portion 86 may limit the rotating speed of the power transmitting member 18, by both limiting the output of the engine 8 and raising the second electric motor speed $N_{M2}$.

In the illustrated embodiments, the excessive speed preventing portion 86 is configured to limit the output of the engine 8 when the power transmitting path is switched to the power cut-off state, but not limit the output of the engine 8 when the power transmitting path is placed in the power transmitting state. However, the excessive speed preventing portion 86 may be configured to limit the output of the engine 8 such that an amount of limitation of the output is larger when the power transmitting path is placed in the power cut-off state than when the power transmitting path is placed in the power transmitting state.

In the illustrated first embodiment, the excessive speed preventing portion 86 limits the output of the engine 8 when the operating speed $N_{M2}$ of the second electric motor M2 is not lower than the upper limit of 5000 rpm. However, the upper limit of the second electric motor speed $N_{M2}$ may be suitably determined depending upon the specific characteristics of the vehicular drive system in the form of the transmission mechanism 10.

While the first embodiment is arranged such that the amount of limitation of the output of the engine 8 changes with the operating speed $N_{M2}$ of the second electric motor M2, according to the engine output limiting map indicated in FIG. 10, the use of this map is not essential. For example, the excessive speed preventing portion 86 may be modified to limit the output of the engine 8 by a predetermined amount when the second electric motor speed $N_{M2}$ exceeds a predetermined upper limit.

The first embodiment is arranged such that the output of the engine 8 continuously or gradually decreases with an increase of the operating speed $N_{M2}$ of the second electric motor M2. This arrangement is not essential. For instance, the output of the engine 8 may decrease in steps depending upon the second electric motor speed $N_{M2}$.

While the engine output limiting map which represents a relationship between the operating speed $N_{M2}$ of the second electric motor M2 and the output of the engine 8 is used to limit the output of the engine 8, the torque of the engine 8 may be limited depending upon the second electric motor speed NM2, since the output and torque of the engine 8 correspond to each other.

In the illustrated transmission mechanism 10, the second electric motor M2 is connected directly to the power transmitting member 18. However, the second electric motor M2 may be connected to any portion of the power transmitting path between the differential portion 11 and the drive wheels 34, either directly or indirectly through a suitable transmission device.

Although the differential portion 11 functions as an electrically controlled continuously variable transmission the gear ratio γ0 of which is continuously variable from the minimum value γ0 min to the maximum value γ0 max, the differential portion 11 may be modified such that its speed ratio γ0 is not variable continuously, but is variable in steps by utilizing its differential function. The present invention is applicable to a hybrid vehicle drive system including the differential portion modified as described above.

The differential portion 11 may be provided with a differential limiting device provided in the power distributing mechanism 16 and operable to limit the differential function of the differential portion 11 for thereby enabling the differential portion 11 to operate as a step-variable transmission having two forward-drive gear positions.

In the power distributing mechanism 16 in the illustrated transmission mechanism 10, the first carrier CA1 is fixed to the engine 8, and the first sun gear S1 is fixed to the first electric motor M1 while the first ring gear R1 is fixed to the power distributing member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated transmission mechanism 10, the engine 8 may be operatively connected to the input shaft 14 through any suitable member such as gears and a belt, and need not be disposed coaxially with the input shaft 14.

In the illustrated transmission mechanism 10, the first and second electric motors M1, M2 are disposed coaxially with the input shaft 14 such that the first electric motor M1 is connected to the first sun gear S1 while the second electric motor M2 is connected to the power transmitting member 18. However, this arrangement is not essential. For instance, the first electric motor M1 may be operatively connected to the first sun gear S1 through gears, a belt or a speed reduction device, while the second electric motor M2 may be connected to the power transmitting member 18.

Each of the hydraulically operated frictional coupling devices used as the first clutch C1 and second clutch C2 in the illustrated transmission mechanism 10 may be replaced by a coupling device of a magnetic-power type, an electromagnetic type or a mechanical type, such as a powder clutch (magnetic powder clutch), an electromagnetic clutch and a meshing type dog clutch. When an electromagnetic type clutch is used, the valve device incorporated in the hydraulic control unit 70 is replaced by a solenoid switching device arranged to switch an electric signal control circuit for controlling the electromagnetic type clutch.

In the illustrated embodiment, the automatic transmission portion 20 is connected in series to the differential portion 11 through the power transmitting member 18. However, the automatic transmission portion 20 may be disposed coaxially with a counter shaft disposed parallel to the input shaft 14. In this case, the differential portion 11 and the automatic transmission portion 20 are connected to each other through a suitable power transmitting member or members in the form of a pair of counter gears, or sprockets and a chain, such that a rotary motion can be transmitted between the differential portion 11 and the automatic transmission portion 20.

Further, the differential mechanism in the form of the power distributing mechanism 16 provided in the illustrated embodiment may be replaced by a differential gear device including a pinion rotated by the engine 8, and a pair of bevel gears which mesh with the pinion and which are operatively connected to the first electric motor M1 and the power transmitting member 18 (second electric motor M2).

While the power distributing mechanism 16 in the illustrated embodiment is constituted by one planetary gear set 24, it may be constituted by two or more planetary gear sets so that the power distributing mechanism 16 is operable as a transmission having three or more gear positions in the non-differential state (fixed-speed-ratio shifting state). The planetary gear sets are not limited to the single-pinion type, and may be of a double-pinion type. Where the power distributing mechanism 16 is constituted by two ore more planetary gear sets, the engine 8, first and second electric motors M1, M2 and power transmitting member 18 are operatively connected to respective rotary elements of the planetary gear sets, and the power distributing mechanism 16 is switched between its step-variable and continuously-variable shifting states, by controlling the clutches C and brakes B connected to the respective rotary elements of the planetary gear sets.

While the engine 8 and the differential portion 11 are connected directly to each other in the illustrated transmission mechanism 10, they may be connected to each other indirectly through a clutch.

In the illustrated transmission mechanism 10, the differential portion 11 and the automatic transmission portion 20 are connected in series to each other. However, the control apparatus according to the present invention is equally applicable to a drive system in which an electrically controlled differential portion and a step-variable transmission portion are not mechanically independent of each other, provided the drive system as a whole has an electric differential function, and a shifting function different from the electric differential function. Further, the electrically controlled differential portion and the step-variable transmission portion may be suitably disposed in a desired order in the drive system.

While the shifting device 50 used in the illustrated transmission mechanism 10 is provided with the shift lever 52 operable to select one of the shift positions $P_{SH}$, the shift lever 52 may be replaced by a switch such as a pushbutton switch or a slide-type switch, or any switching device, which is operable to select one of the shift positions $P_{SH}$. The switching device may be operable by a voice generated by the vehicle operator or a foot of the vehicle operator, rather than by hand, to select one of the shift positions $P_{SH}$. Although the illustrated transmission mechanism 10 is arranged such that the number of the gear positions of the automatic transmission portion 20 available can be changed by operating the shift lever 52 from the manual forward-drive shifting position M to a shift-up position "+" or a shift-down position "−", the highest gear position available may be set in the manual forward-drive shifting position M. When the fourth gear position is selected as the highest gear position by operating the shift lever 52 to the shift-up position "+" or shift-down position "−", for example, the automatic transmission portion 20 is automatically shifted to one of the first gear position through the fourth gear position.

It is to be understood that the embodiments of the invention have been described for illustrative purpose only, and that the present invention may be embodied with various changes and modifications which may occur to those skilled in the art.

What is claimed is:

1. A control apparatus for a drive system of a vehicle including (a) an electrically controlled differential portion having (i) a differential mechanism, (ii) a first electric motor operatively connected to a rotary element of the differential mechanism, (iii) a drive power source, an input shaft connected to the drive power source, and (iv) an output shaft, a differential state between rotating speeds of the input and output shafts being controlled by controlling an operating state of the first electric motor, (b) a switching portion operable to switch a power transmitting path between the output shaft and a drive wheel of the vehicle, between a power transmitting state and a power cut-off state, and (c) a second electric motor (M2) connected to said power transmitting path, said control apparatus comprising:

an excessive speed preventing portion configured to limit a rotating speed of said output shaft or an operating speed of said second electric motor when said power transmitting path is switched by said switching portion from the power transmitting state to the power cut-off state.

2. The control apparatus according to claim 1, wherein said excessive speed preventing portion limits an output of said drive power source to limit the rotating speed of said output shaft or the operating speed of said second electric motor.

3. The control apparatus according to claim 2, wherein said excessive speed preventing portion limits the output of the drive power source such that an amount of limitation of said output is larger when the rotating speed of the output shaft or the operating speed of the second electric motor is relatively high than when the rotating speed or the operating speed is relatively low.

4. The control apparatus according to claim 2, wherein said drive power source is an internal combustion engine, and said excessive speed preventing portion limits an output of said internal combustion engine by implementing a fuel cut control of the internal combustion engine.

5. The control apparatus according to claim 2, wherein said drive power source is an internal combustion engine, and said excessive speed preventing portion limits an output of said internal combustion engine by limiting an angle of opening of a throttle valve of the internal combustion engine.

6. The control apparatus according to claim 1, wherein said excessive speed preventing portion controls an operating speed of said first electric motor, to limit the rotating speed of said output shaft or the operating speed of said second electric motor.

7. The control apparatus according to claim 1, wherein said switching portion includes a manually operable shifting member having a plurality of shift positions, and switches said power transmitting path between the power transmitting state and the power cut-off state, according to an operation of the manually operable shifting member.

8. The control apparatus according to claim 1, wherein said electrically controlled differential portion is operable as a continuously-variable transmission mechanism by controlling the operating state of said first electric motor.

9. The control apparatus according to claim 1, wherein the differential mechanism is a planetary gear set having three rotary elements consisting of a carrier connected to the input shaft of the electrically controlled differential portion, a sun gear connected to the first electric motor, and a ring gear connected to the output shaft of the electrically controlled differential portion.

10. The control apparatus according to claim 2, wherein said excessive speed preventing portion limits the output of the drive power source such that an amount of limitation of said output is larger when said power transmitting path is placed in said power cut-off state than when the power transmitting path is placed in said power transmitting state.

* * * * *